US008713261B1

(12) United States Patent
Aharoni et al.

(10) Patent No.: US 8,713,261 B1
(45) Date of Patent: Apr. 29, 2014

(54) CACHING TECHNIQUES

(75) Inventors: Dan Aharoni, Brookline, MA (US);
Amnon Naamad, Brookline, MA (US);
Alex Veprinsky, Brookline, MA (US);
Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 320 days.

(21) Appl. No.: 13/065,016

(22) Filed: Mar. 11, 2011

(51) Int. Cl.
*G06F 12/00* (2006.01)

(52) U.S. Cl.
USPC .................................. 711/137; 711/E12.041

(58) Field of Classification Search
None
See application file for complete search history.

(56) References Cited

U.S. PATENT DOCUMENTS

| | | | |
|---|---|---|---|
| 5,544,347 A | 8/1996 | Yanai et al. | |
| 5,664,145 A * | 9/1997 | Apperley et al. | 711/117 |
| 5,742,792 A * | 4/1998 | Yanai et al. | 711/162 |
| 6,018,788 A * | 1/2000 | Ichikawa | 711/113 |
| 6,049,850 A * | 4/2000 | Vishlitzky et al. | 711/136 |
| 6,216,199 B1 * | 4/2001 | DeKoning et al. | 711/3 |
| 6,260,115 B1 * | 7/2001 | Permut et al. | 711/134 |
| 6,557,075 B1 * | 4/2003 | Maher | 711/113 |
| 6,622,168 B1 * | 9/2003 | Datta | 709/219 |
| 6,807,619 B1 | 10/2004 | Ezra et al. | |
| 7,117,309 B2 * | 10/2006 | Bearden | 711/137 |
| 7,143,393 B1 | 11/2006 | Ezra et al. | |
| 7,146,467 B2 * | 12/2006 | Bearden et al. | 711/137 |
| 7,484,041 B2 * | 1/2009 | Yoshikawa | 711/137 |
| 7,493,450 B2 * | 2/2009 | Bearden | 711/137 |
| 7,500,056 B2 * | 3/2009 | Wheeler et al. | 711/118 |
| 7,539,818 B2 * | 5/2009 | Malcolm et al. | 711/118 |
| 7,552,195 B2 * | 6/2009 | Datta | 709/217 |
| 7,574,564 B2 * | 8/2009 | Moyer | 711/128 |
| 7,581,067 B2 * | 8/2009 | Johns | 711/144 |
| 7,600,076 B2 * | 10/2009 | Johns | 711/118 |
| 7,640,262 B1 * | 12/2009 | Beaverson et al. | 1/1 |
| 7,644,221 B1 * | 1/2010 | Chan et al. | 710/315 |
| 7,664,981 B2 * | 2/2010 | Kim | 714/5.1 |
| 7,673,099 B1 * | 3/2010 | Beaverson et al. | 711/118 |
| 7,865,475 B1 * | 1/2011 | Yadav et al. | 707/655 |
| 2005/0172076 A1 * | 8/2005 | Olson et al. | 711/122 |

(Continued)

OTHER PUBLICATIONS

Webopedia, "Cylinder", Oct. 1, 2002, pp. 1, http://web.archive.org/web/20021001234515/http://www.webopedia.com/TERM/C/cylinder.html.*

(Continued)

*Primary Examiner* — Edward Dudek, Jr.
*Assistant Examiner* — Christopher Birkhimer
(74) *Attorney, Agent, or Firm* — Muirhead and Saturnelli, LLC

(57) ABSTRACT

Described are techniques for caching. At a first point in time, a first set of data portions currently stored in a first cache of a first data storage system is determined. Each data portion of the first set is located on a first device of the first data storage system. Sent to a second data storage system is first information including information identifying a storage location on the first device for each data portion of the first set. The second data storage system includes a second device that is maintained as a mirror of the first device. The storage location for each data portion of the first set is used to identify a second storage location of the second device corresponding to the storage location. The first information is used to populate a second cache of the second data storage system.

20 Claims, 11 Drawing Sheets

(56) References Cited

U.S. PATENT DOCUMENTS

| | | |
|---|---|---|
| 2006/0129766 A1* | 6/2006 | Cassia et al. .................. 711/137 |
| 2008/0172519 A1* | 7/2008 | Shmulevich et al. ......... 711/103 |
| 2008/0263280 A1* | 10/2008 | Gara et al. .................... 711/121 |
| 2009/0049233 A1* | 2/2009 | Chen et al. .................... 711/103 |
| 2009/0172287 A1* | 7/2009 | LeMire et al. ................ 711/128 |
| 2009/0198892 A1* | 8/2009 | Alvarez et al. ................ 711/118 |
| 2009/0276577 A1* | 11/2009 | Bell .............................. 711/137 |
| 2010/0005243 A1* | 1/2010 | Yagi .............................. 711/126 |

OTHER PUBLICATIONS

Webopedia, "Track", Apr. 6, 2001, pp. 1-2, http://web.archive.org/web/20010406011405/http://www.webopedia.com/TERM/T/track.html.*

Webopedia, "Head", Feb. 17, 2001, pp. 1, http://web.archive.org/web/20010217140914/http://webopedia.com/TERM/h/head.html.*

Shuchi Chawla, "CS787: Advanced Algorithms", Oct. 31, 2007, pp. 1-6, http://pages.cs.wisc.edu/~shuchi/courses/787-F07/scribe-notes/lecture20.pdf.*

* cited by examiner

CACHING TECHNIQUES

BACKGROUND

1. Technical Field

This application generally relates to data storage, and more particularly to caching techniques.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

Caching may be used in data storage systems to improve performance. Different techniques may be used to store and/or retain in cache the data which is expected to be referenced at a future point in time. When servicing a data request, a system may first determine whether the requested data is in cache. If so, then the data request may be serviced using the cached data thereby avoiding the additional time required to retrieve the requested data from a physical device. However, if the requested data is not in cache, the requested data is retrieved from the physical device, may be stored in the cache, and is used to service the data request. The amount of time to service the data request may be reduced when the requested data is already in cache rather than having to wait the additional time to retrieve the requested data from a physical device.

SUMMARY OF THE INVENTION

In accordance with one aspect of the invention is a method of performing caching comprising: determining one or more caching profiles, wherein each of said caching profiles identifies a plurality of data portions stored in cache and each of said caching profiles is associated with criteria identifying when to use said each caching profile to pre-populate a cache; selecting a first of said caching profiles for use in pre-populating the cache prior to usage at a second point in time, said first caching profile including criteria matching said second point in time; and pre-populating the cache prior to said second point in time with data portions identified in said first caching profile. The method may include processing a plurality of data operations directed to one or more devices of a data storage system; recording what data portions are stored in cache at one or more points in time while processing said plurality of data operations; and creating said one or more caching profiles, each of said caching profiles being associated with one of said points in time and identifying a plurality of data portions stored in cache in accordance with said recording. The criteria may include information characterizing activity causing the data portions to be stored in cache. The criteria may identify any of a time of day, a day of a week, one or more days of a month, an application, one or more months, date information, and time information. The cache may be included in a data storage system. Each of the caching profiles may identify at least one data portion stored in cache by identifying a physical location on a data storage device associated with said at least one data portion. The physical location may be identified using a plurality of physical device coordinates. The plurality of physical device coordinates may include a device identifier, cylinder, and head or track identifier. For each data portion identified as being stored in cache by said each caching profile, said each caching profile may include one or more indicators, each of said indicators being any of an age indicator of how long said each data portion has been in cache, an age indicator of when said each data portion was last used, a data operation indicator regarding what data operation has been most recently performed using said each data portion, and a data operation indicator regarding what data operation caused said each data portion to be retrieved from physical storage and loaded into cache.

In accordance with another aspect of the invention is a method for caching comprising: determining, at a point in time, a first set of data portions currently stored in a first cache of a first data storage system, each data portion of said first set being located on a first device of the first data storage system; sending, to a second data storage system, first information including information identifying a storage location on said first device for each data portion of said first set, wherein said second data storage system includes a second device that is maintained as a mirror of the first device, said storage location for each data portion of said first set used to identify a second storage location of said second device corresponding to said storage location; and using said first information to populate a second cache of the second data storage system. The first data storage system may fail and the second data storage system may service data requests directed to the first data storage system, wherein data requests directed to the first device of the first data storage system are serviced using corresponding data portions from the second device and second cache of the second data storage system. The method may also include automatically propagating writes that are applied to the first device of the first data storage system to the second device of the second data storage system. A hash table may be used to determine said first set of data portions. The hash table may include a plurality of entries identifying a plurality of cache locations of the first cache, each of said cache locations having stored therein a data portion of the first set. A remote data facility may be used to automatically propagate the writes that are applied to the first device from the first data storage system to the second data storage system and said remote data facility may be used to send the first information to the second data storage system. For each data portion of the first set, the first information may include a timestamp associated with said each data portion, said timestamp indicating a cache age associated with said each data portion. The method may also include traversing a hash table to identify cache slots including cached data from the first device; and using a mapping function to determine a storage device location on the first device corresponding to a hash entry of the hash table.

In accordance with another aspect of the invention is an apparatus comprising: a first data storage system including a first cache and a first device; a second data storage system including a second cache and a second device; and a computer readable medium of executable code stored thereon for: determining, at a point in time, a first set of data portions currently stored in the first cache, each data portion of said first set being located on the first device; sending, from the first data storage system to the second data storage system, first information including information identifying a storage location on said first device for each data portion of said first set, wherein said second device is maintained as a mirror of the first device, said storage location for each data portion of said first set used to identify a second storage location of said second device corresponding to said storage location; and using said first information to populate the second cache of the second data storage system.

In accordance with another aspect of the invention is a computer readable medium comprising code stored thereon for caching, the computer readable medium comprising code for: determining, at a point in time, a first set of data portions currently stored in a first cache of a first data storage system, each data portion of said first set being located on a first device of the first data storage system; sending, to a second data storage system, first information including information identifying a storage location on said first device for each data portion of said first set, wherein said second data storage system includes a second device that is maintained as a mirror of the first device, said storage location for each data portion of said first set used to identify a second storage location of said second device corresponding to said storage location; and using said first information to populate a second cache of the second data storage system. The first data storage system may fail and the second data storage system may service data requests directed to the first data storage system, wherein data requests directed to the first device of the first data storage system are serviced using corresponding data portions from the second device and second cache of the second data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
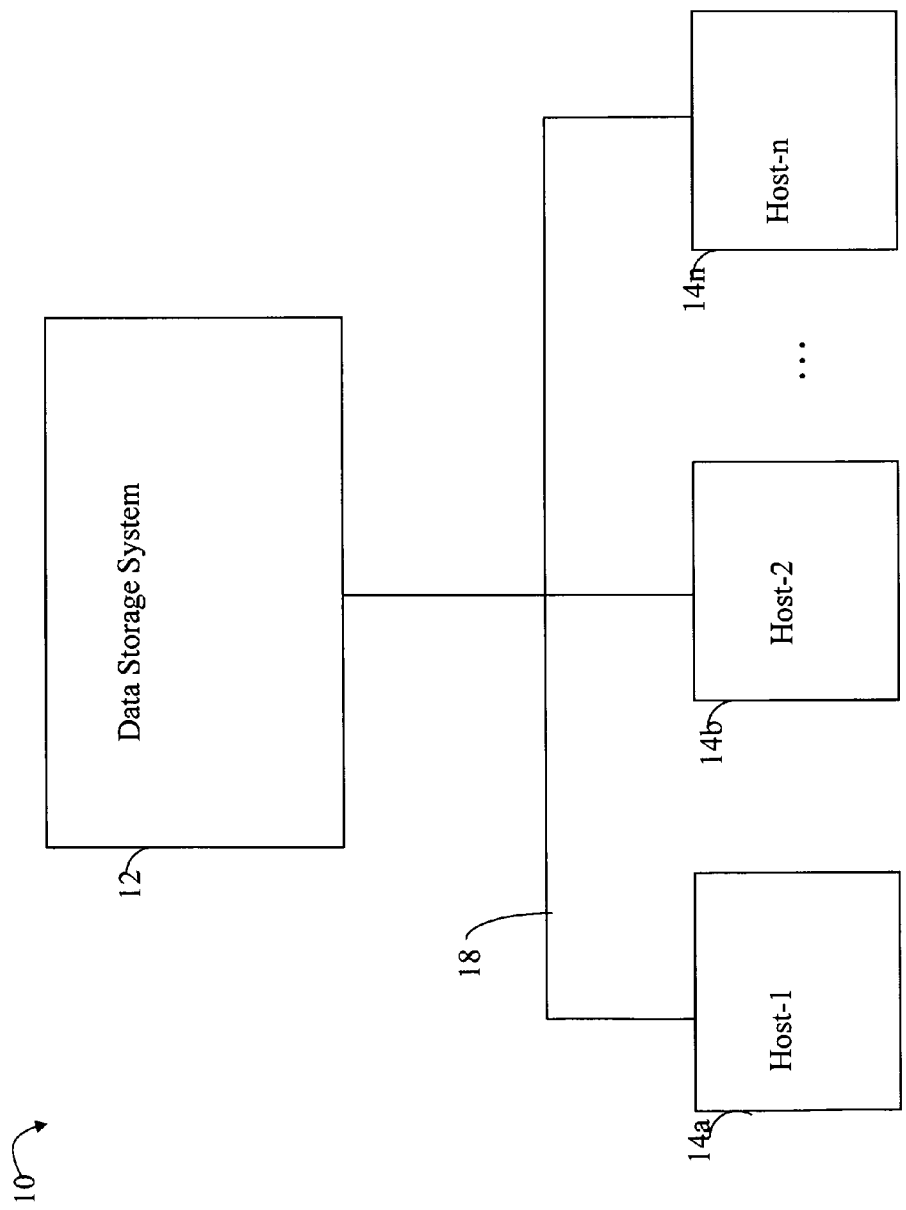
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the data storage system 12 communicates with other components such as host systems 14a-14n.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system 12 may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, Ficon, SCSI, Fibre Channel, FCoE (Fibre Channel over Ethernet) or iSCSI, and the like. Some or all of the connections by which the hosts and data storage system 12 may be connected to the communication medium 18 may pass through other communication devices, such as Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment. For example, in an embodiment using multiple data storage systems, such as multiple data storage arrays, such data storage systems may be connected to one another and may use techniques such as RDF (Remote Data Facility) by EMC Corporation. In some instances, it may be desirable to copy data from one storage system to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. Data storage device communication between Symmetrix™ data storage systems using RDF is described, for example, in U.S. Pat. Nos. 5,742,792 and 5,544,347, both of which are incorporated by reference herein. With RDF, a user may denote a first storage device as a master storage device (also referred to as the R1 device) and a second storage device as a slave storage device (also referred to as the R2 or mirror device with respect to the R1 device). Other incarnations of RDF may provide a peer to peer relationship between the local and remote storage devices. The host interacts directly with the local storage device, but any data changes made to the local R1 storage device are automatically provided to a remote R2 storage device using RDF. The local and remote storage devices may be connected by a data link, such as an ESCON link, GigE link, or a Fibre Channel link. The RDF functionality may be facilitated with an RDF adapter (RA) provided at each of the storage systems.

Figure 2A:
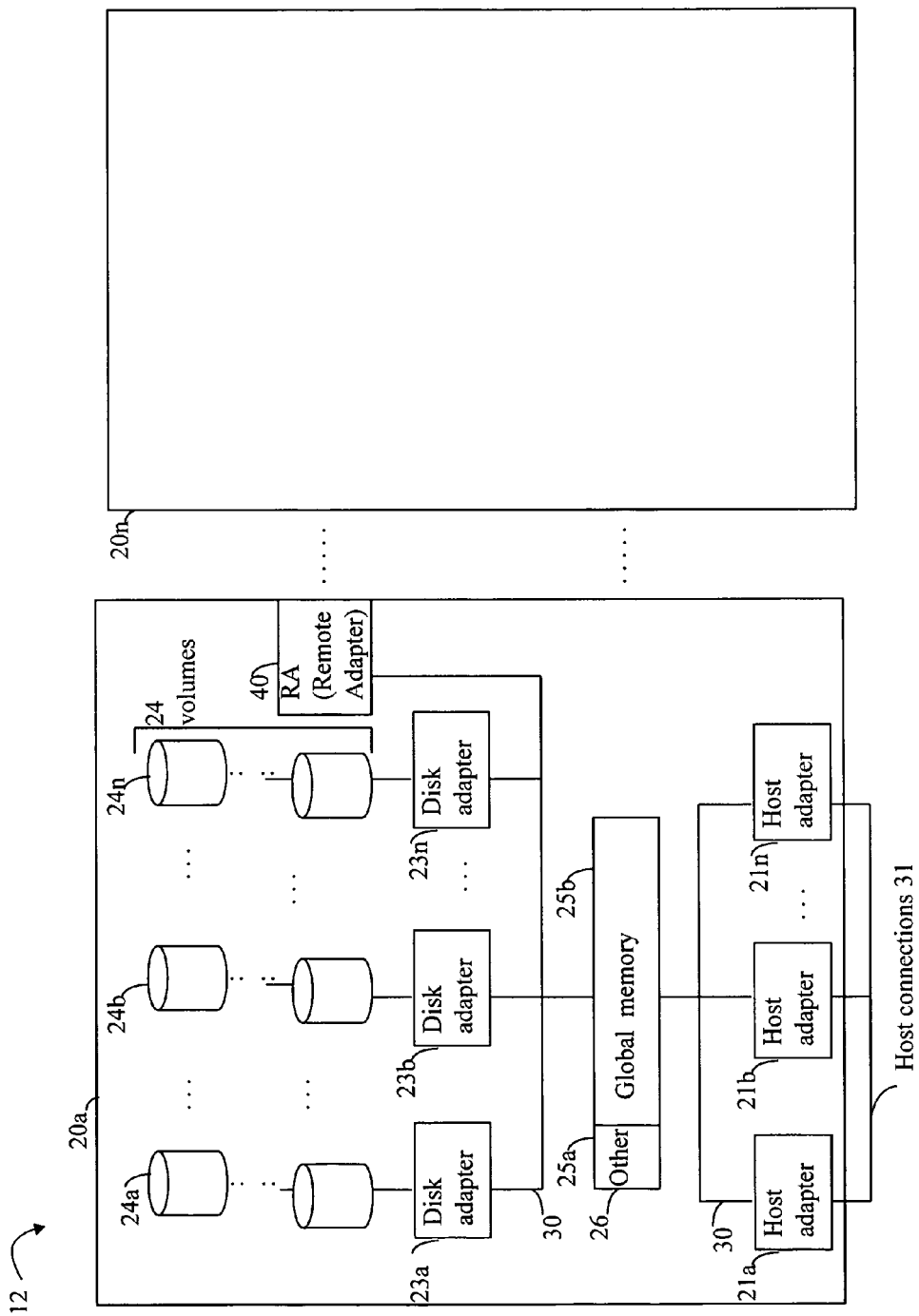
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses, fabric, and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory (GM) 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. For example, an embodiment in accordance with techniques herein may include multiple storage tiers of solid state storage (SSD) devices, such as flash drives, as well as one or more other storage tiers comprising one or more types of rotating disks. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. A single LV may also reside on multiple physical drives, for example depending on the RAID protection and layout. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
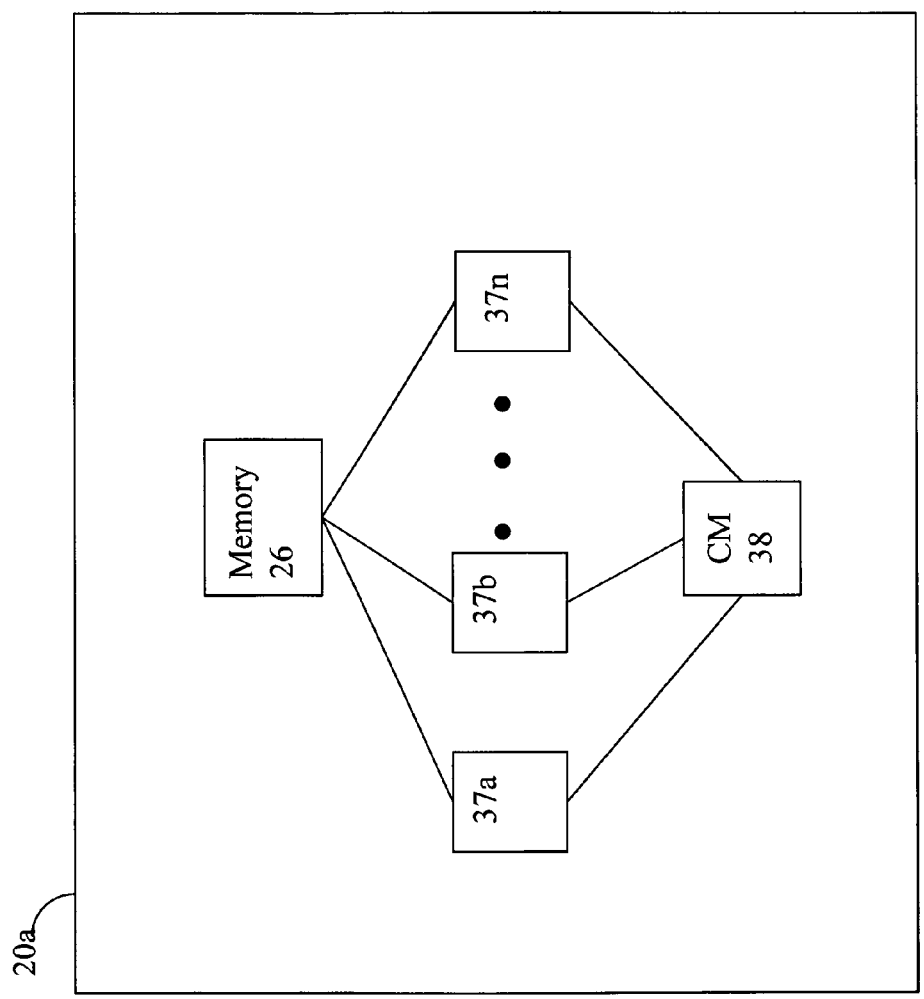
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 2A, components of the data storage system may communicate using GM 25b. For example, in connection with returning data to a host from one of the devices as part of a read operation, the data may be copied from the device by the appropriate DA servicing the device. The DA may copy the data read into a cache slot included in GM which is, in turn, communicated to the appropriate HA in communication with the host.

As described above, an embodiment may include a cache in the global memory portion 25b of FIG. 2. An embodiment may utilize any one of a variety of different caching data structures and management techniques. Examples of different types of cache arrangements are described, for example, in U.S. Pat. No. 6,807,619, Oct. 19, 2004, ADVANCING BANK POINTER IN PRIME NUMBERS UNIT, Ezra et al., and U.S. Pat. No. 7,143,393, November 28, 2006, METHOD FOR CACHE MANAGEMENT FOR POSITIONING CACHE SLOT, Ezra et al., both of which are incorporated by reference herein. The foregoing are just some examples of cache arrangements that may be used in an embodiment with the techniques herein.

It should be noted that an embodiment may use different techniques in connection with data that is read from, or written to, devices in the data storage system. For example, the cache may be used in connection with processing data for read and write operations. In connection with a read operation, processing may be performed to determine whether the data is located in cache. If so, the read operation may be serviced using (by retrieving and returning) the requested data from the cache. Otherwise, the DA may read the data requested from the device, store it in a cache slot included in cache, and then return the retrieved data to the requester that issued the read operation. The cache and cache slots are described in more detail elsewhere herein. The cache slot may hold a particular amount of data such as a track of data. A track is also described elsewhere herein in more detail. The DA, for example, may obtain a cache slot if there is not already one allocated and associated with a particular data track. The data is read from the physical device by the DA and stored in the cache slot. Indicators associated with the cache slot and other structures may be appropriately updated in accordance with the data operation, the state of the data included in the cache slot, and the like. Data that is to be written to a device may be first stored in a cache slot and the cache slot may be appropriately updated (e.g., marked as a write pending by setting appropriate indicators of the cache slot and other data structures). The write pending data is then actually written out or destaged from the cache to the physical device at a later point in time.

If all the data associated with a read operation is in cache, the read operation may be described as resulting in a cache hit or read hit. Otherwise, the read operation may be described as resulting in a cache miss or read miss since the read operation cannot be serviced by retrieving all data from the cache. Additional data for the read operation resulting in a cache miss is read from disk to service the read operation. Thus, servicing a read which has a corresponding read hit may be serviced faster if the read has a corresponding read miss.

In connection with data storage systems, a first device of a first data storage system may have a second device maintained as a mirror of the first device on a second data storage system. Writes to the first device may be applied in an ongoing manner to the second device as part of maintaining the second device as a mirror of the first device such as using RDF described above. The first data storage system may be an active system used on a regular basis for servicing I/O operations. The second data storage system may be characterized as a passive system which becomes the active system upon the occurrence of a disaster rendering the first data storage system inoperable. As a result of processing data operations of an application directed to the first device, a first cache of the first data storage system may be populated with a set of data providing a favorable read hit rate for the application. If a disaster occurs so that the first data storage system is inoperable, the second data storage system, and the mirror or the second device, may be used as the active system to service data operation requests for the application. For a time period after the failover to the second data storage system, the application may experience a performance decrease due to a reduced read hit rate. The reason for this reduced hit rate may be explained as follows. Initially after failover, the second cache of the second data storage system may be empty or otherwise not contain the read data requested by the application. As data operations are issued by the application, read misses result causing the requested data to be retrieved from the second storage device, stored in cache, and then returned to the requesting application. As more data operations are issued, the second cache of the second data storage system eventually becomes populated with data used by the application thereby resulting in an increase in the application's read hit rate and general performance. What will be described in following paragraphs are techniques that may be used in connection with alleviating the performance penalty experienced by the application following the initial failover to the second data storage system.

Figure 3:
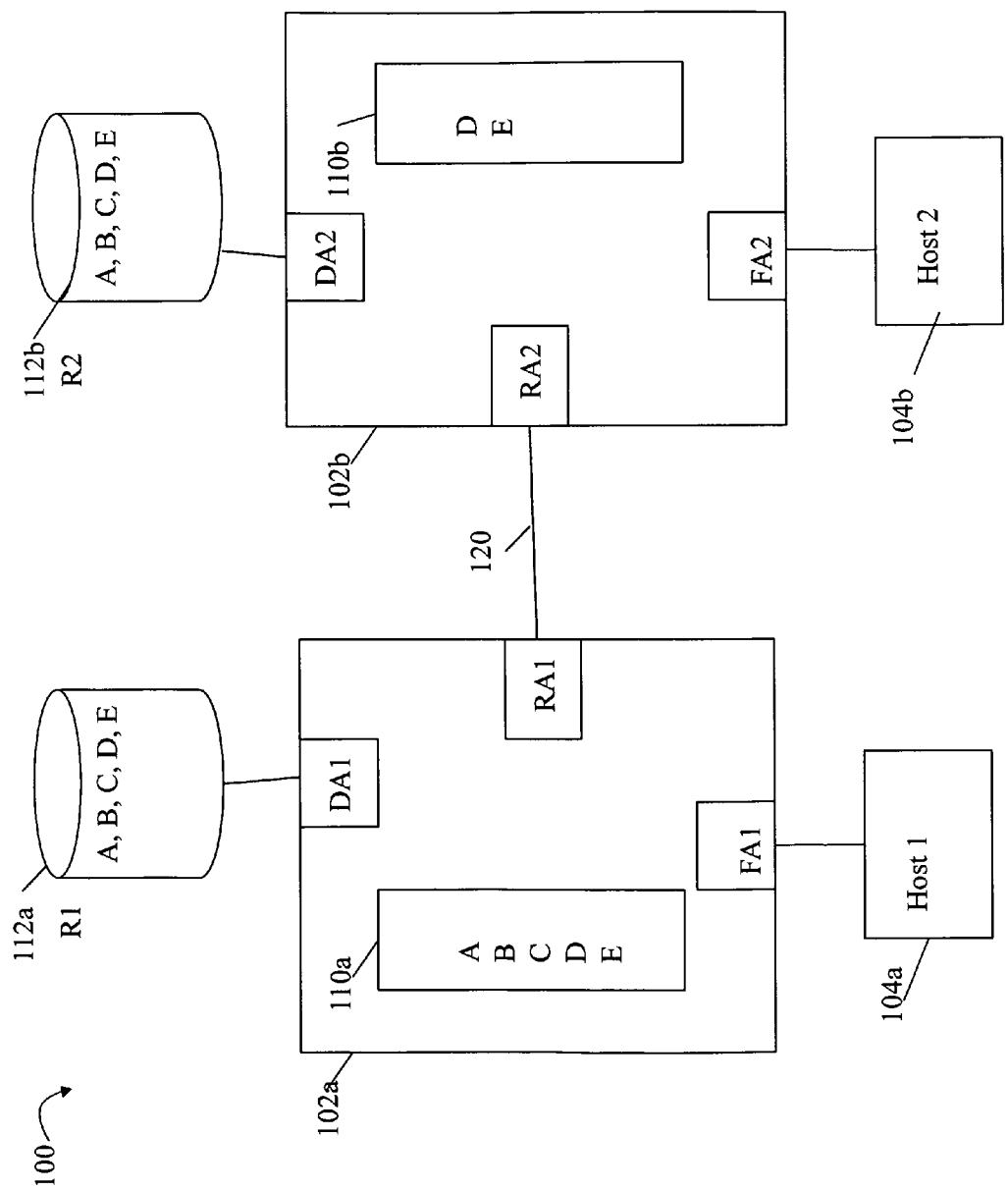
FIG. 3 is an example of an embodiment of a system that may utilize the techniques herein.

Referring to FIG. 3, shown is an example of an embodiment of a system in accordance with techniques herein. The example 100 includes data storage systems 102a, 102b and hosts 104a, 104b. Data storage systems 102a, 102b may be instances of data storage arrays such as described above. For simplicity of illustration however, some details have been omitted in the representation of FIG. 3. Data storage system 102a includes cache 110a, device 112a and components DA1 (disk adapter 1), RA1 (remote adapter 1), and FA1 (Fibre-Channel adapter). Data storage system 102b includes cache 110b, device 112b and components DA2 (disk adapter 2), RA2 (remote adapter 2), and FA2 (Fibre-Channel adapter 2). System 102a may be the active or primary data storage system described above and system 102b may be the passive or secondary data storage system described above. In one embodiment using RDF, device 112a may be the R1 or primary device and device 112b may be the R2 or mirror of 112a. The host 104a may have an application executing thereon which performs data operations to device 112a. Any writes to the device 112a may be received by FA1, written to cache 110a and destaged by DA1 to device 112a. The writes may also be automatically propagated using RDF to the R2 device 112b by RA1 to RA2 over connection 120. RA2 may then place the write operation data in the cache 110b. At some later point in time, the DA2 destages the writes to the mirror or R2 device 112b.

To further illustrate, assume host 1 104a performs the following sequence of data operations: Read A, B, C; Write D, E. Each of A, B, C, D and E may refer to data stored on the device 112a (e.g., data stored at a physical device location or address of 112a). As a result, the cache 110a of the data storage system 102a may be populated as illustrated. Additionally, the operations to Write D and E are propagated automatically from data storage system 102a to data storage system 102b, stored in cache 110b, and destaged to device 112b. Such write operations may include information identifying the physical device location for each of the data items D and E. Assume host 1 104a now issues Read A, B, C, D, E. Since all the requested read data is stored in the cache 110a, there are is a 100% read hit rate. At this point, there is a disaster and data storage system 102a and host 104a are offline. As a result, there is a failover to data storage system 102b and host 2 104b where system 102b and host 104b assume the roles, respectively, of the primary data storage system and primary host. Read requests from host 104b may be serviced by data storage system 102b which now becomes the active data storage system. Host 2 104b now issues Read A, B, C, D, E and experiences a read miss for A, B and C and a read hit for only D and E (e.g., a 60% read miss rate). The data for the read misses of A, B and C are retrieved from 112b and brought into cache 110b (not illustrated). However, the cache 110b is not initially populated with the same or similar data as cache 110a at the time of failover. Therefore, the host 104b experiences the reduced read hit rate as just illustrated until the cache 110b becomes more populated with appropriate data for host 2 104b as may be brought in from the physical devices in response to receiving the read requests.

In connection with techniques herein, an embodiment may use the information regarding what data is stored in cache 110a to populate cache 110b so that, upon the occurrence of a failover as just described, the host 104b will not experience the initial reduced read hit rate while waiting for cache 110b to be populated as a result of read misses. More specifically, an embodiment may propagate information from data storage system 102a to 102b regarding not only the data stored in cache 110a which is written to device 112a, but may also propagate information from 102a to 102b regarding the data stored in cache 110a that is read from 112a. With respect to the example of FIG. 3, RDF may be used as the transfer means by which information identifying what data is stored in cache 110a may be propagated from 102a to 102b. The functionality of RDF may be used to facilitate transferring the information regarding what data is stored in cache 110a at various points in time from 102a to 102b in an ongoing continual manner.

Continuing with the example above, information identifying physical device locations of all of the data stored in cache 110a—that is regarding A, B, C, D and E—may be sent from 102a to 102b using RDF. Since device 112b mirrors 112a, the data system 102b may then use this information to retrieve the data from device 112b and populate cache 110b prior to a failover to system 102b thereby populating cache 110b in manner similar to that of cache 110a. In this way, when system 102a fails over to 102b as the primary data storage system, the data for all of A-E will already be in cache and the read-hit ratio will not be adversely affected. To implement the foregoing, DA1 may scan all the cache slots which have been recently placed in the cache 110a. The foregoing may be determined by associating an age, such as using a timestamp, with each cache slot. As described in more detail below, the timestamp, or more generally age of a cache slot, may be related to the last time the data of the cache slot was used or referenced in connection with a data operation. Recent cache slots may be those having timestamps within a predetermined time interval with respect to the current time. For each cache slot containing cached data for location on a device, the DA1 may determine whether the device has an RDF mirror on system 102b. If so, the DA1 may add the location to a list along with the timestamp associated with identified cached location. At the end of the scan which may run for a predetermined amount of time at defined time intervals, the DA1 may create an RDF special task request or message to send the accumulated list of locations to data storage system 102b. As described in more detail elsewhere herein, the accumulated list of locations may be included in the payload of the RDF special task request. The RA1 on system 102a sends the new special task request to RA2 of system 102b. On the system 102b, payload of the received RDF special task request message is parsed to extract the list of locations (e.g., the list of locations on device 112a for items A-E). For each location, a request to DA2 is issued to retrieve the data from physical device 112b and store the data in cache 110b. DA2 may service the foregoing requests to retrieve data from device 112b based on DA2's schedule and availability that may vary with what other processing DA2 is performing (e.g., relative priorities associated with different types of processing that DA2 performs).

It should be noted that although RDF is described above in an exemplary embodiment, more generally, the techniques described may be used with any communication and transfer means available to send the information identifying the data cached in 110a from data storage system 102a to data storage system 102b.

It should be noted that based on typical usage of data storage systems, the inventors have determined that an average amount of time which data remains in cache (such as cache 110a) is on the order of several minutes. Within such amount of time, the information regarding what data is stored in cache 110a may be transferred to data storage system 102b and used to populate cache 110b so that cache 110b contains useful data (e.g., not outdated) upon a failover to system 102b occurring.

What will now be described are additional details that may be used in an embodiment in connection with techniques herein.

Figure 4:
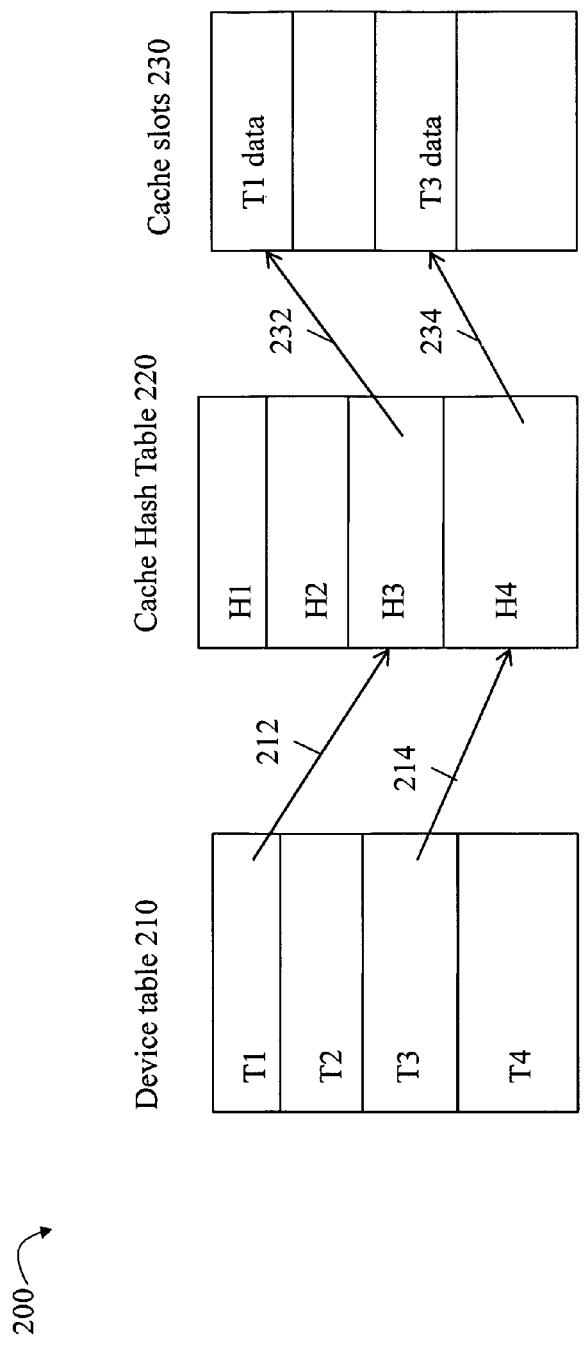
FIGS. 4, 5, and 5A are example of structures that may be used in an embodiment in accordance with techniques herein.

Referring to FIG. 4, shown is an example illustrating how a data portion of a storage device, such as a track of data, may be mapped to a cache slot for storage in cache using a hash table. The example 200 includes a device or track id table 210, cache hash table 220 and cache slots 230. In connection with performing operations, such as in connection with an I/O operation for a device, a device table 210 which includes device information may be used.

The device table 210 may include an entry associated with each data portion of device, such as each track of data. A device table may exist for each data device in the data storage system 102a, 102b of FIG. 3. In this example for a simple illustration, device table 210 may include 4 entries for 4 corresponding tracks of a device. The tracks are denoted in the device table 210 as tracks T1 through T4, inclusively. An embodiment of a device table 210 is described in more detail below and may include various information for each device track. The location or physical position of a track of a device may be uniquely identified based on three parameters or coordinates corresponding to a device identifier or number, cylinder, and track identifier or head identifier. As known in the art with mechanical disk drives, a device may have an associated device identifier. A rotating disk drive may comprise several platters and data may be read from/written to on one or two surfaces/sides of a platter using a device head (e.g., 4 platters may have 8 heads, each head being associated with a particular platter and surface thereof). Tracks are concentric circles on a single platter surface. A cylinder includes the same track number on each platter spanning all such tracks across all platters of the device. It should be noted that a particular track or other portion other unit of storage may be used in an embodiment. Additionally, although a track of data may be uniquely identified by three coordinates or parameters, an embodiment may identify a track or other unit of storage using a different number of parameters or coordinates depending on the particular drive and storage medium. For example, the techniques herein may also be used in connection with SSD or flash-based media and may identify a unit of storage for use with the techniques herein using three parameters as described herein or using another set of one or more parameters to uniquely identify each unit of storage, its physical location on the media, and the like.

If a track has data stored in a cache slot, the (device, cylinder, track/head) associated with the track may be used to determine a corresponding hash value using a hashing function. Hashing techniques including hashing functions, hash tables, hash collision resolution techniques, and the like, are known in the art, any of which may be used in connection with the cache hash table 220. Generally, the hash function may hash the (device, cylinder, track/head) associated with the track to a hash value. The hash value may identify a particular entry or element in the cache hash table 220. Depending on how the cache hash table 220 is implemented, an entry or element in 220 may be associated with one or more device tracks. For purposes of simplicity, an exemplary embodiment may have a single entry of hash table 220 associated with a single device track. In the example 200, if a track in 210 has its data in cache, there is a connection (e.g., arrows 212, 214) illustrated for the track from an entry of 210 to entry in 220. The arrows 212 and 214 may represent the logical mapping effected by the hash function. Each entry of device table 210 corresponding to a track having data stored in cache may include a field (e.g., containing a pointer, address, index value, and the like) identifying a corresponding entry in the cache hash table 220. For example, track T1 is mapped 212 by the hash function to hash table 220 entry H3, and track T3 is mapped 214 by the hash function to hash table 220 entry H4 indicating that data for tracks T1 and T3 are stored in cache. However, data for tracks T2 and T4 are not stored in cache. Each entry of the cache hash table 220 may identify (e.g., such as via an address, index or pointer) a cache slot containing the associated track's data. For example, hash table entry H3 identifies 232 the cache slot containing track T1 data and entry H4 identifies 234 the cache slot containing track T3 data. In this manner, each entry of the cache hash table 220 may include an actual pointer or address field to an associated cache slot of 230.

Figure 5:
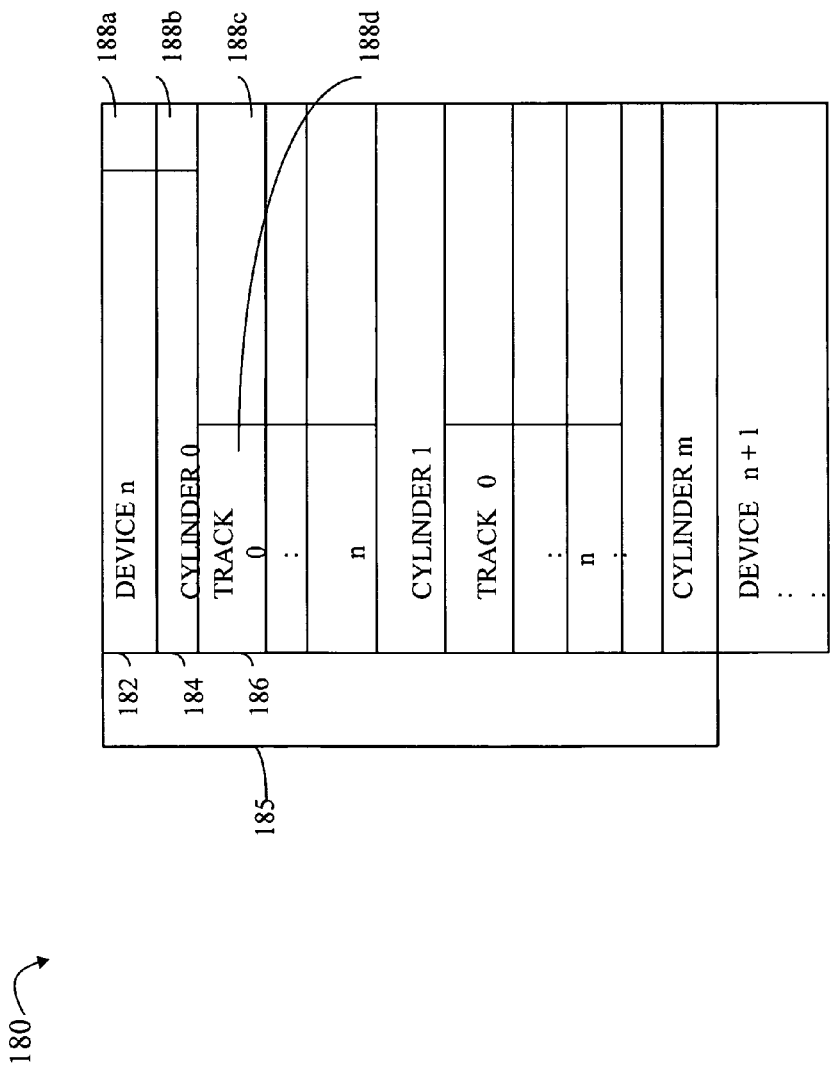

Referring to FIG. 5, shown is an example of a representation of a device table, also referred to as a track id table 180. The table 180 may be organized on a device-by-device level to indicate device state information for a particular portion of a device. Such information of the device table may be used for example, to determine if the data from the portion is in cache, and if so, where in cache is it located. An embodiment that includes devices, such as disks, may include a further refinement or granularity in the table 180 corresponding to a location in cache. The table 180 may also be used to store other information about each particular track. The table 180 may be stored as device metadata in a portion of global memory of a data storage system as illustrated in other figures herein.

The table 180 may include a hierarchical structure relative to the structure of a disk, such as cylinders and tracks on a disk. In one embodiment, a track may be a 64K byte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184, and for each track within each cylinder 186. For a device, a bit indicator 188a may indicate whether data associated with the device is stored in cache. The bit indicator 188b may further indicate for a particular cylinder within a device, is any data stored in the cache. Associated with each track may be a corresponding portion 188c which may include information about a particular track.

In one embodiment, if data of a particular track is in cache, portion 188c may identify a particular hash value or entry in the cache hash table as described above. In turn, as illustrated in FIG. 4, the cache hash table may be used to determine the cache slot including the track's data. It should be noted that the hash value, pointer, index, or other information identifying an entry in table 220 of FIG. 4 for a track may alternatively not be stored as a field in the device table but may rather be determined using a mapping or mathematical function each time when needed. For example, as described above, a track may be uniquely identified based on the device identifier or number, cylinder, and track/head identifier associated with the particular data track. A hash function may be used to determine a hash value for a track based on the track's device identifier or number, track, and cylinder/head. From the track's corresponding hash value, an entry within the hash table may be determined. The hash table entry, in turn, maps to a cache slot including data cached for the track.

Thus, in one exemplary embodiment, the cache hash table may be used in connection with determining what data for a data operation, such as a read request, is in cache. In an embodiment using a hash function as described herein with reference to FIG. 4, an entry in the cache hash table may be determined using the device, track, and cylinder/head for a track having data stored in cache. If there is no entry in the cache hash table corresponding to the track, then the track has no data stored in cache. In turn, for each track having a corresponding cache hash table entry, the entry may identify the cache slot containing the track's data. Thus, the cache hash table may be used in connection with determining whether a track has data stored in cache, and if so, identify the cache slot containing the track's data.

Figure 5A:
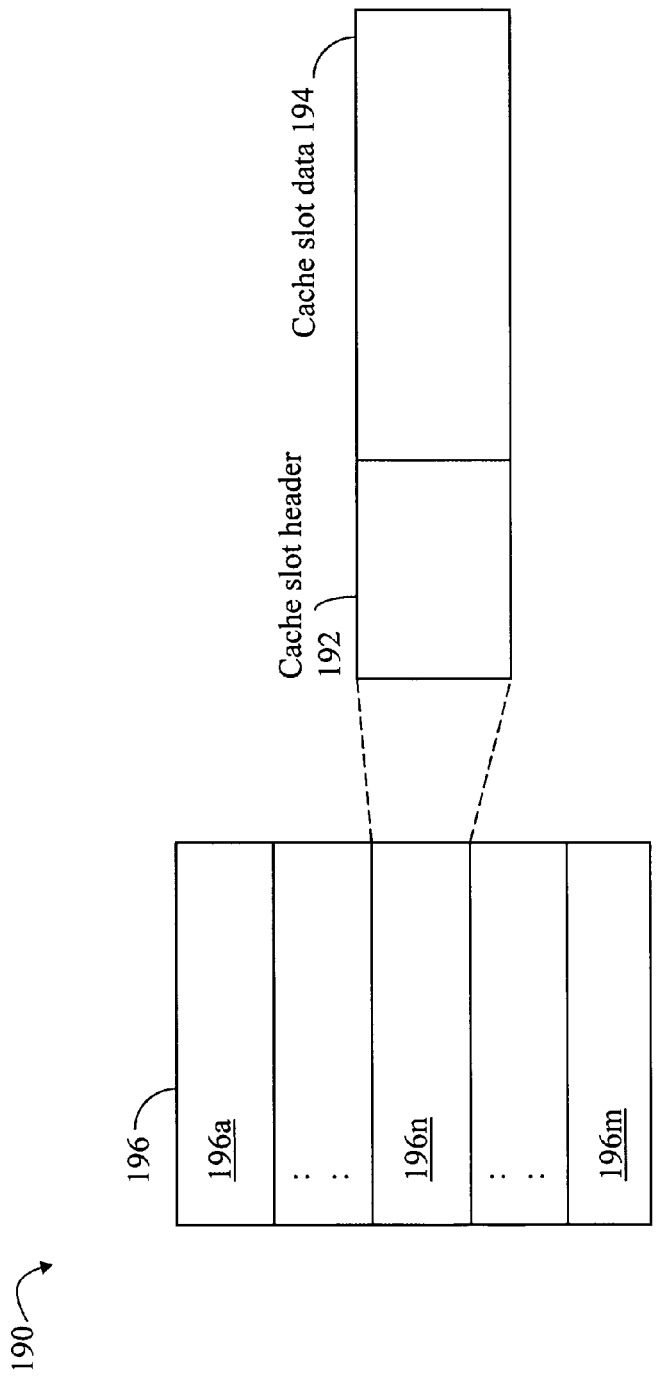

Referring to FIG. 5A, shown is an example of a logical representation of a cache including cache slots. The example 190 includes a cache 196 with a plurality of cache slots 196a-196m. It should be noted that the cache 196 may be characterized as a logical representation of the cache since any one of a variety of different arrangements and data structures may be used in an embodiment. Element 196n shows additional detail regarding a cache slot. A cache slot 196n may include a header portion 192 and a data portion 194. The cache slot header 192 may include one or more pieces of information used in connection with cache management. The cache slot data portion 194 may include the cached data, for example, such as a track of data (or portions of less than a track) stored in the cache in connection with an I/O operation. The cache slot header 192 may include, for example, a timestamp identifying when the data was brought into cache. Depending on the particular cache management techniques implemented in an embodiment, the timestamp may be updated at various points such as each time the data of the cache slot is referenced. The timestamp may be used to indicate an age associated with the cached data (e.g., relative to other cached data) and may be used in connection with various cache management techniques such as cache eviction techniques to select a cache slot whose data is removed from cache when there are no free or unused cache slots. An age of a cache slot may be determined relative to other cache slots by timestamp comparisons. Additionally, the closer a timestamp is to the current point in time, the more recent (or younger) the associated cache slot.

As described above, an embodiment may provide a first mapping function which maps a device track to a corresponding cache hash entry or hash value if the track is in cache. If a track location may be expressed as a function of device, cylinder, and track/head, then a first mapping function, F1, may be represented as:

F1(DEVICE, CYLINDER, TRACK/HEAD)=HASH ENTRY or HASH VALUE

Similarly, the embodiment may also provide a second mapping function, F2 with performs the reverse of the foregoing first mapping function F1. In other words, given a cache hash entry or hash value produced using the hashing function described herein, the second mapping function determines the corresponding track stored at the cache slot. The second mapping function may return information identifying the corresponding track by the track's coordinates in terms of device, cylinder and track/head identifiers. The second mapping function F2 may be represented as:

F2(HASH ENTRY OR HASH VALUE)=(DEVICE, CYLINDER, TRACK,/HEAD)

The foregoing mapping functions F1 and F2 may be represented using equations based on the particular mathematical hashing function selected for F1 and F2. An embodiment may also determine the necessary information supplied by the functions F1 and F2 in other ways rather than algorithmically such as by maintaining pointers and values in data structures used in an embodiment. For example, rather than use a second or reverse mapping function with reference to FIG. 4, an embodiment may use pointers to associate a cache slot of 230 with a particular track in the device table 210.

In connection with the techniques herein and with reference to FIGS. 3 and 4, an embodiment may obtain a list of what data is in cache 110a by traversing the cache hash table 220 to identify those entries associated with cache slots. In this case, the device table may not be utilized. Additionally, for each cache hash table entry of table 220 associated with a cache slot, the second or reverse mapping function F2 described above may be used to obtain the location of the track in terms of device, cylinder, and track/head, where the track is mapped to a particular cache hash entry. The cache hash entry may be used to determine the cache slot and obtain the corresponding time stamp. Thus, the information which is transmitted between data storage systems to pre-populate the cache of a receiving data storage system may be determined as just described.

As another option to identify tracks having data stored in cache for use with techniques herein, an embodiment may use the device table and traverse the device table a device at a time. For each device, processing may be performed to determine whether each track of the device is stored in cache. This may be performed, for example, by providing an API or third function to query the cache hash table providing as input parameters the track's location information as expressed in terms of device, cylinder, and track/head information. The third function may return either an indicator that the track is not in cache, or otherwise return a pointer or identifier to the cache slot containing the track's data. The third function may determine whether a track has data stored in cache, for example, using the structures described in connection with FIG. 4 (e.g., is a track's device table entry associated with a corresponding entry in the cache hash table). An embodiment may perform processing per device on a scheduled, periodic basis such as by executing a background task at predetermined time intervals. Information regarding what tracks of each device are stored in cache of the data storage system 102a may be obtained and such information may be accumulated for a single device, and then transferred from the primary data storage system 102a to the secondary data storage system 102b.

For each track having data stored in cache 110a, the information used to identify the track's location may be the device identifier, cylinder identifier, and track/head identifier. Such information may be accumulated in a list as described above along with a timestamp or other age indicator for each track of data stored in the cache 110a.

Figure 6:
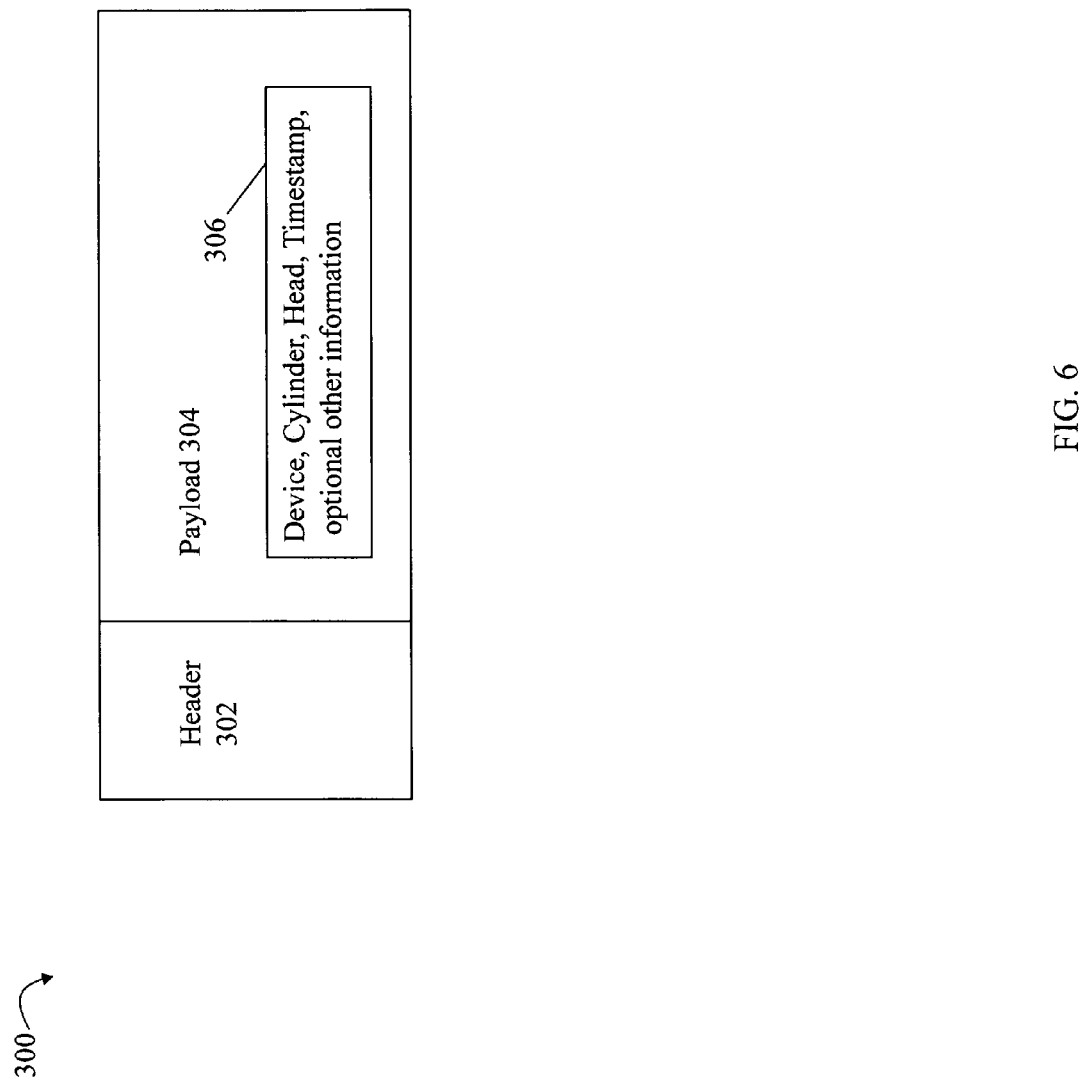
FIG. 6 is an example of a request message that may be used to transmit the list of locations to pre-populate a cache in an embodiment in accordance with techniques herein.

Referring to FIG. 6, shown is an example of a request that may be used in an embodiment in accordance with techniques herein. The example 300 includes a representation of a request that may be transmitted from data storage system 102a to 102b to communicate information regarding currently cached data of system 102a which is used to populate another cache of data storage system 102b. The request message may include a header 302 and a payload 304. The header 302 may include an operation code identifying the request to use the information in the payload 304 to populate the cache of the receiving data storage system. The particular operation code of 302 may be used to instruct the receiving data storage system what operations to perform using the payload 304. The payload 304 may include information 306 identifying the physical device location of each track to be retrieved and stored in the cache of the receiving data storage system. The information 306 may also include the timestamp associated with each cached track of data on the sending data storage system. The timestamp may be obtained, for example, from the cache slot header of the cache slot as illustrated and described in connection with FIG. 5. It should be noted that an embodiment may also optionally transmit other information for each track identified in the payload 304. For example, an embodiment also transmit an indicator as to whether the last operation which referenced the identified track was a read or a write operation. Such information may be used to further characterize the cached data and may be used in connection with other optimizations as may vary with embodiment.

The foregoing techniques may be generalized for use with embodiments using technologies other than RDF as the transport mechanism to transfer the information used to populate the cache of the second data storage system. It should be noted that the information such as the location information, timestamp, and other optional information illustrated in the payload 304 of FIG. 6 may be transferred to the receiving data storage system in a variety of ways including for example, by manual and/or automated loading/unloading of data from a device such as flash drive transferred from one data storage system to another.

The techniques for cache populating herein may also be further generalized using caching profiles or templates within a single data storage system as well as multiple different data storage systems. For example, an embodiment may track what information is in a cache of a data storage system at different times throughout the same day, different points in a week, month, year, and the like, to create caching profiles or cache initialization templates. Each profile may identify what information is stored in cache (e.g., identify the physical device location of where such information resides on a storage device) and criteria identifying when to use this profile to initialize or populate the cache. The criteria identifying when to use a particular caching profile may be expressed in temporal terms such as times of the day, week, month, and the like. The criteria may also be expressed in terms of a particular activity performed, an application that is executed, information describing the event occurrence, and the like. For example, there may be particular caching profiles used to initialize cache at the end of every business day, in connection with end of month accounting activities, etc. For example, the criteria may identify the day(s) of the month such as the last two days of a month, or what particular application(s) are executed such as an accounting reporting application to obtain the caching profile data. Therefore, the criteria may identify the application name or instance and when the application is expected to run (e.g., dates or times of days/months). The caching profile associated with the criteria including the application name and when the application is expected to run may be used to populate the cache prior to the application's expected usage. To further illustrate, every Monday at 9 a.m. the stock market opens and a first caching profile may include criteria identifying the time period of Monday, 9 a.m. The caching profile may identify what is to be loaded into cache. If appropriate, the criteria for the caching profile may also identify one or more software applications which will utilize the data populating the cache. The foregoing caching profile may be determined based on previously observed and recorded information during operation of a data storage system. The foregoing caching profile may be used to pre-populate the cache prior to the stock market opening each Monday at 9 a.m. In this way, the one or more software applications using the data identified in the caching profile may reduce the initial read misses that would otherwise occur to initially get data used by the applications into cache.

The criteria for a caching profile such as when to use this profile for cache initialization may be expressed in terms of one or more parameters. Such parameters may include date/time information (e.g. one or more dates/times of day, day or week), application(s) to be executed, keywords such as TAX TIME, END OF MONTH REPORTING, END OF YEAR REPORTING, ACCOUNTING ACTIVITIES, weekend operations, and the like. Such criteria of a caching profile may be matched against criteria characterizing a current time period or usage to determine/select a caching profile for use in pre-populating or initializing the cache prior to an expected usage of the data storage system. An embodiment may observe what tracks are in cache at different points in time over a period of time to initially create or define the caching profiles. The same, as well as a different, data storage system may then use the caching profiles at subsequent points in time to pre-populate its cache prior to expected matching usages.

Figure 7:
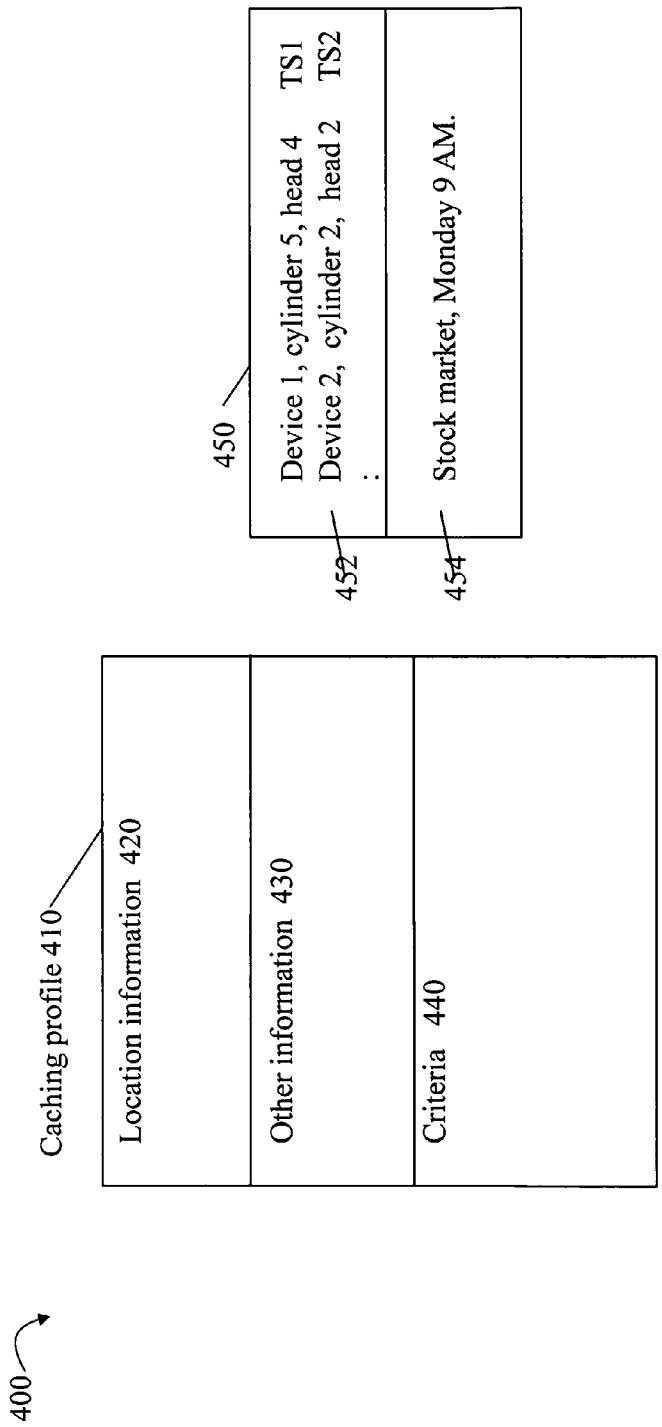
FIG. 7 is an example illustrating a caching profile that may be used in an embodiment in accordance with techniques herein.

Referring to FIG. 7, shown is an example illustrating information that may be included in a caching profile used in connection with techniques herein. The example 400 includes a caching profile 410 that may include location information 420, other information 430 (e.g., associated with the identified location or tracks of 420), and criteria 440. Element 450 provides additional detail illustrating what information may be included in a caching profile such as described above in connection with the stock market. Element 452 includes the location information (in terms of device, cylinder and track/head information) identifying the particular tracks to be retrieved from physical storage and loaded into cache. Element 452 also includes timestamp information (denoted as TS1 and TS2) associated with identified tracks. The timestamp information may be an example of other information 430 that may be stored in the caching profile. Element 454 represents the criteria for the profile identifying when the caching profile should be used to pre-populate the cache (e.g., prior to Monday at 9 AM when the stock market will open). An embodiment may have one or more such caching profiles used in connection with initializing cache of one or more data storage systems.

Figure 8:
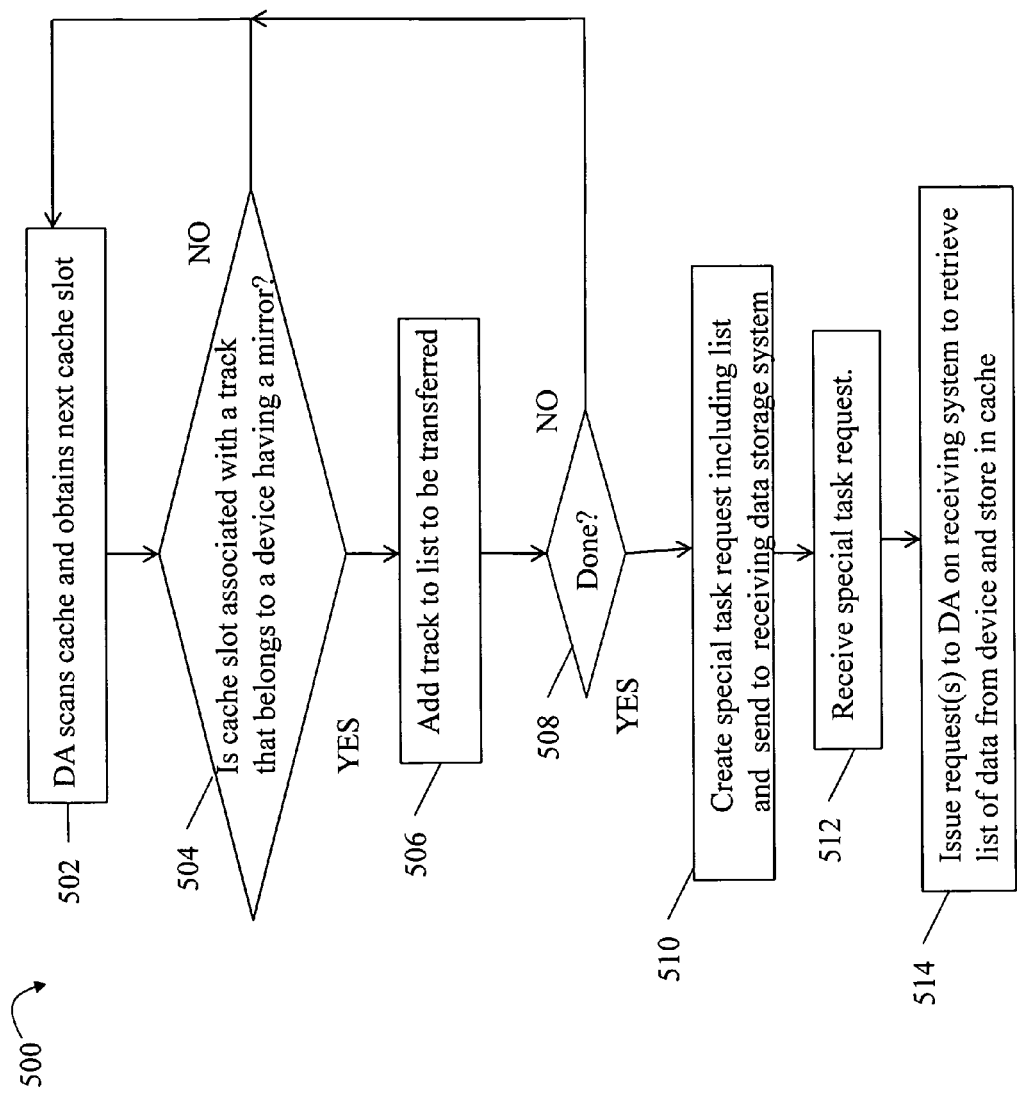
FIGS. 8 and 9 are flowcharts of processing steps that may be performed in an embodiment in accordance with techniques herein.
Figure 9:
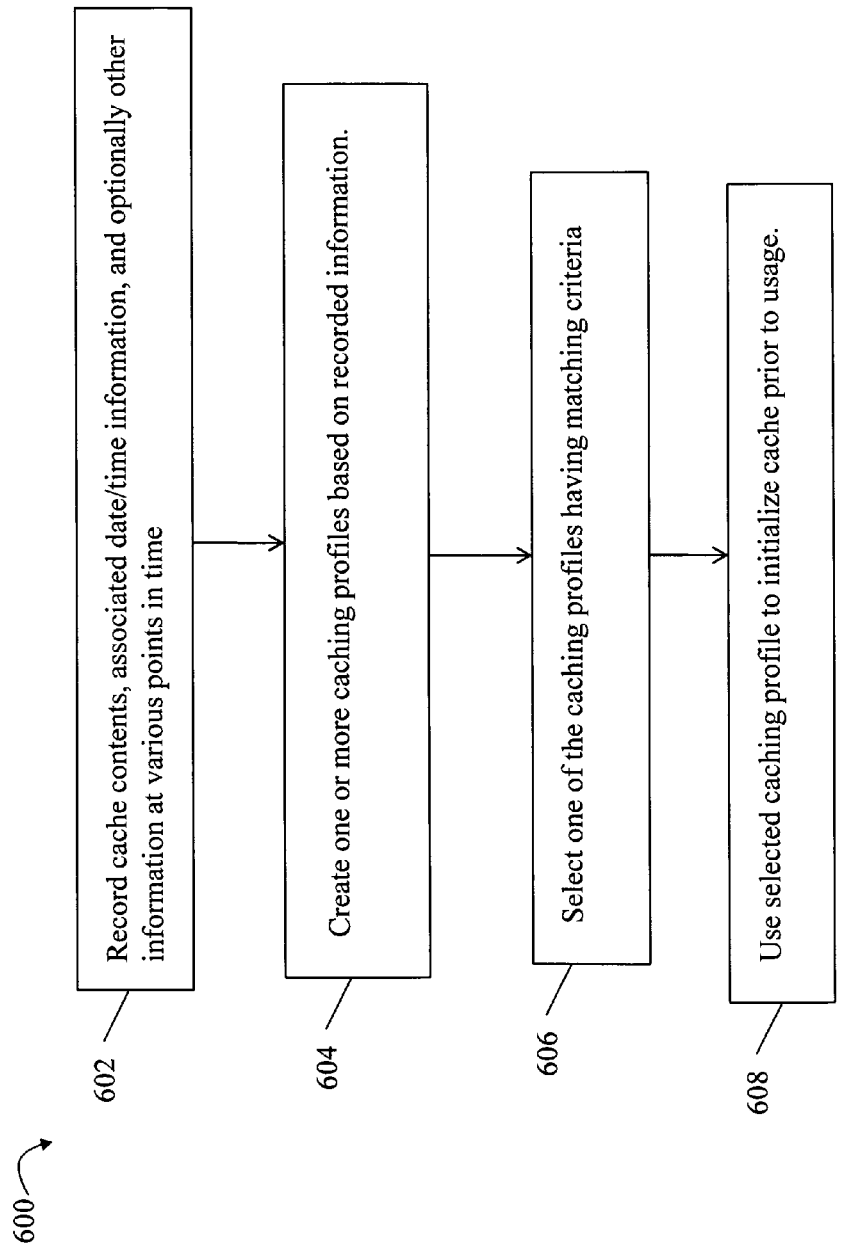

Referring to FIGS. 8 and 9, shown are flowchart of processing steps summarizing processing that may be performed in an embodiment. The flowcharts of FIGS. 8 and 9 summarize processing described above.

With reference to flowchart 500 of FIG. 8, shown are processing steps as may be performed by a first data storage system to collect and transmit information about what is stored in its cache to a second receiving data storage system. It should be noted that the processing steps of flowchart 500 may be executed, for example, at each occurrence of predetermined time interval and may run for a period of time to process a portion of cache slots such as the most recent or newest ⅓ of all cache slots. At step 502, the DA of the first data storage system may scan the cache and obtain the next cache slot. At step 504, a determination is made as to whether the cache slot is associated with a track belonging to a device which has a mirror on the second data storage system. If not, control proceeds to step 502 to process the next cache slot. If step 504 evaluates to yes, control proceeds to step 506 to add the track to a list to be transferred. Step 506 may include recording the track's device location, timestamp and any other optional information to be transferred to the second data storage system. At step 508, a determination is made as to whether processing for the current scan is complete such as after a predetermined amount of scan time has expired. If step 508 evaluates to no, control proceeds to step 502. If step 508 evaluates to yes, control proceeds to step 510 to create the special task request including the list of cache locations. The request is then sent to the second receiving data storage system. At step 512, the second data storage system receives the special task request and processes the request. At step 514, requests are issued to the DA on the second receiving data storage system to retrieve the list of data identified in the special task request from the mirror device and store the data in cache. Step 514 may be performed as allowed based on availability of the DA on the receiving data storage system. For example, the DA may process the requests to populate the (cache with the data of the list included in the special task request as a background operation having relatively low priority so as not to interfere with other work performed by the DA.

Referring to FIG. 9, shown is a flowchart 600 of processing steps as may be performed in connection with creating and using caching profiles. At step 602, the cache contents, associated date/time information and optionally other information may be recorded at various points in time during operation of the data storage system. At step 604, one or more caching profiles may be created based on the recorded information from step 602. At a later point in time, step 606 may be executed to utilize the caching profiles. At step 606, one of the caching profiles may be selected having criteria that matches a current set of search criteria. For example, a match may be determined based a date and/or time information. At step 608, the selected caching profile may be used to initialize the cache prior to usage. Step 608 may include processing to retrieve from the physical storage device the data corresponding to the location information of the cache profile, and store the retrieved data (along with other information such timestamps) in cache. In this way, the cache may be pre-populated with relevant data prior to usage in order to avoid the performance penalty that may typically otherwise be experienced until the cache is populated as a result of read misses.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for caching comprising:
    determining, at a point in time, a first set of data portions currently stored in a first cache of a first data storage system, each data portion of said first set being located on a first device of the first data storage system;
    sending, to a second data storage system, first information including information identifying a storage location on said first device for each data portion of said first set, wherein said second data storage system includes a second device that is maintained as a mirror of the first device, said storage location for each data portion of said first set used to identify a second storage location of said second device corresponding to said storage location; and
    using said first information to populate a second cache of the second data storage system.

2. The method of claim 1, further comprising:
    determining one or more caching profiles, wherein each of said caching profiles identifies a plurality of data portions stored in cache and each of said caching profiles is associated with criteria identifying when to use said each caching, profile to pre-populate a cache, wherein at least a first of said one or more caching profiles is associated with criteria including any of date information and time information identifying, a time of day, wherein, for each of said plurality of data portions identified by said first caching profile as being stored in said cache, said first caching profile includes one or more indicators including an age indicator indicating any of when said each data portion was last used and how long said each data portion has been in cache;
    selecting said first caching profile for use in pre-populating the cache prior to usage at a second point in time, wherein said first caching profile is associated with criteria matching said second point in time; and
    pre-populating the cache prior to said second point in time with data portions identified in said first caching profile and with other information including said age indicator of the first caching profile for each data portion stored in the cache by said pre-populating.

3. The method of claim 2, wherein the method further includes:
    processing a plurality of data operations directed to one or more devices of a data storage system;
    recording what data portions are stored in cache at one or more points in time while processing said plurality of data operations; and
    creating said one or more caching profiles, each of said caching profiles being associated with one of said points in time and identifying a plurality of data portions stored in cache in accordance with said recording.

4. The method of claim 2, wherein criteria associated with the first caching profile includes information characterizing activity causing the data portions to be stored in cache.

5. The method of claim 2, wherein criteria associated with the first caching profile identifies any of a day of a week, one or more days of a month, an application, and one or more months.

6. The method of claim 2, wherein the cache is included in a data storage system.

7. The method of claim 2, wherein each of the caching profiles identifies at least one data portion stored in cache by identifying a physical location on a data storage device associated with said at least one data portion.

8. The method of claim 7, wherein the physical location is identified using a plurality of coordinates.

9. The method of claim 8, wherein the plurality of coordinates includes a device identifier, cylinder, and head or track identifier.

10. The method of claim 7, wherein, for said each data portion identified as being stored, in cache by said each caching profile, said one or more indicators for said each data portion included in said each caching profile includes a data operation indicator regarding whether a read data operation or a write data operation has been most recently performed using said each data portion.

11. The method of claim 1, wherein the first data storage system fails and the second data storage system services data requests directed to the first data storage system, wherein data requests directed to the first device of the first data storage system are serviced using corresponding data portions from the second device and second cache of the second data storage system.

12. The method of claim 1, further comprising:
    automatically propagating writes that are applied to the first device of the first data storage system to the second device of the second data storage system.

13. The method of claim 12, wherein a remote data facility is used to automatically propagate the writes that are applied to the first device from the first data storage system to the second data storage system and said remote data facility is used to send the first information to the second data storage system.

14. The method of claim 1, wherein a hash table is used to determine said first set of data portions.

15. The method of claim 14, wherein said hash table includes a plurality of entries identifying a plurality of cache locations of the first cache, each of said cache locations having stored therein a data portion of the first set.

16. The method of claim 1, wherein, for each data portion of the first set, the first information includes a timestamp associated with said each data portion, said timestamp indicating a cache age associated with said each data portion.

17. The method of claim 1, further comprising:
traversing a hash table to identify cache slots including cached data from the first device, and
using a mapping function to determine a storage device location on the first device corresponding to a hash entry of the hash table.

18. An apparatus comprising:
a first data storage system including a first cache and a first device;
a second data storage system including a second cache and a second device; and
a non-transitory computer readable medium of executable code stored thereon for:
determining, at a point in time, a first set of data portions currently stored in the first cache, each data portion of said first set being located on the first device;
sending, from the first data storage system to the second data storage system, first information including information identifying a storage location on said first device for each data portion of said first set, wherein said second device is maintained as a mirror of the first device, said storage location for each data portion of said first set used to identify a second storage location of said second device corresponding to said storage location; and
using said first information to populate the second cache of the second data storage system.

19. A non-transitory computer readable medium comprising code stored thereon for caching, the non-transitory computer readable medium comprising code for:
determining, at a point in time, a first set of data portions currently stored in a first cache of a first data storage system, each data portion of said first set being located on a first device of the first data storage system;
sending, to a second data storage system, first information including information identifying a storage location on said first device for each data portion of said first set, wherein said second data storage system includes a second device that is maintained as a mirror of the first device, said storage location for each data portion of said first set used to identify a second storage location of said second device corresponding to said storage location; and
using said first information to populate a second cache of the second data storage system.

20. The non-transitory computer readable medium of claim 19, wherein the first data storage system fails and the second data storage system services data requests directed to the first data storage system, wherein data requests directed to the first device of the first data storage system are serviced using corresponding data portions from the second device and second cache of the second data storage system.

* * * * *